Sept. 3, 1929. F. B. EILERS 1,727,317
LIQUID DISPENSING APPARATUS
Filed Sept. 7, 1926
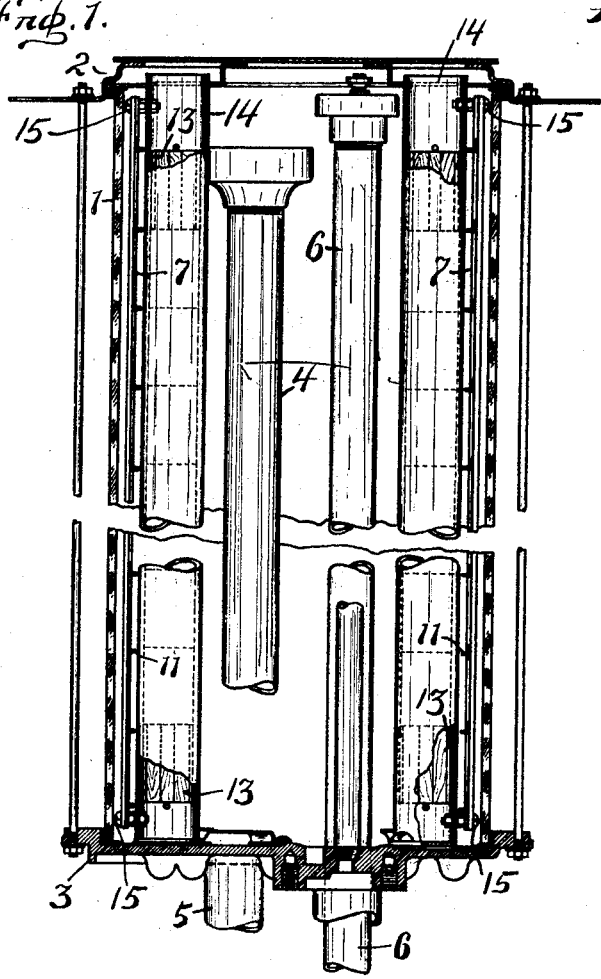
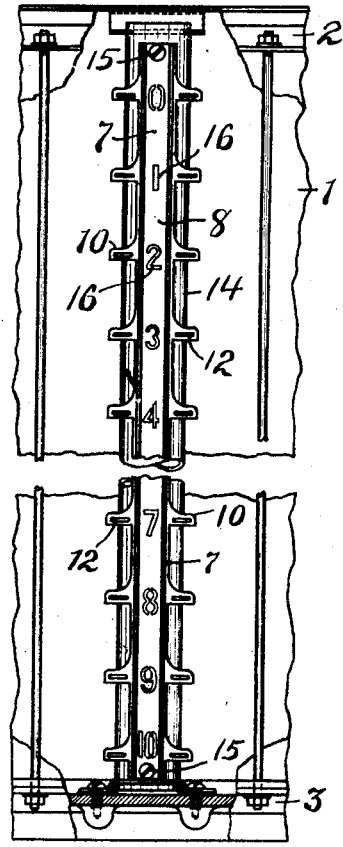
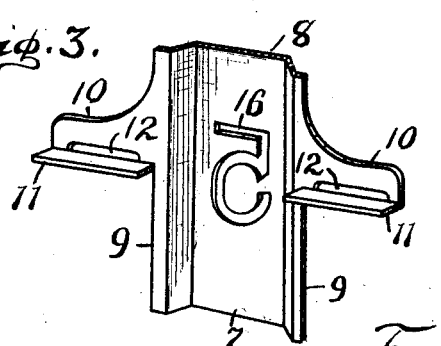
Frank B. Eilers INVENTOR
BY
H. G. Burns ATTORNEY Patented Sept. 3, 1929.

1,727,317

UNITED STATES PATENT OFFICE.

FRANK B. EILERS, OF FORT WAYNE, INDIANA, ASSIGNOR TO TOKHEIM OIL TANK AND PUMP COMPANY, A CORPORATION OF INDIANA.

LIQUID-DISPENSING APPARATUS.

Application filed September 7, 1926. Serial No. 133,939.

This invention relates to improvements in liquid dispensing apparatus especially of the visible type in which a glass measure is employed for displaying gasoline as it is dispensed. The object of the invention is to provide a gauge disposed in the glass measure by which the quantity of liquid in the measure may be observed, and which will cause visible manifestations at definite points when the level of liquid in the measure recedes from one predetermined stage in the vessel to another.

This object of the invention is accomplished by the construction illustrated in the accompanying drawings, in which:—

Fig. 1 is a vertical section of a construction embodying the invention, a portion thereof being broken away;

Fig. 2 is a fragmentary front elevation projected from Fig. 1; and

Fig. 3 is a fragmentary perspective view of the gauge.

The characters appearing in the description refer to parts shown in the drawings and designated thereon by corresponding characters.

The invention is applicable to measures having a glass cylinder 1 into which liquid is run preliminary to being dispensed. The measure herein shown as an example includes the glass cylinder provided with top and bottom heads 2 and 3 respectively, there being an overflow pipe provided for the return of the overplus liquid to the underground tank (not shown) from which liquid is supplied to the measure through the supply pipe 5 in the usual manner. Also, the measure is provided with a sliding gauge tube 6 through which liquid in the measure is dispensed by lowering the tube more or less according to the quantity of liquid to be withdrawn from the measure, as in the usual practice.

Within the measure are positioned, adjacent the wall of the glass cylinder, gauge members 7, each of which consists of a channel shaped bar 8 having lateral flanges 10 from which extend wings 10 disposed in opposite pairs, each wing having a ledge 11 extending rearwardly from its lower edge, and a horizontally disposed sight aperture 12 at the juncture of the ledge and corresponding wing.

It is desirable that the pairs of wings 10 be equally spaced, and that the quantity of liquid in the measure between the successive pairs of wings be uniformly equal, so that the quantity of liquid dispensed from the measure through the gauge tube will be proportionate with the downward movement of the tube. As the glass cylinders usually employed for measures of the type contemplated herein, vary in diameter from one end to the other, and also in thickness of their walls, their containing capacity consequently vary accordingly, and in order to adjust the containing capacity of the measure so that those portions of the measure between the successive pairs of wings will be uniformly equal, there is provided in the measure displacement members 13 disposed in series in corresponding tubes 14, similar to that set forth in my previous invention for which Letters Patent No. 1,401,897, were granted December 27, 1921. In the present instance the stationary tubes 14 that retain the displacement members are utilized as mounts for the gauge members 7, there being screws 15 at the top and bottom of each gauge member for securing the members to the corresponding tube.

A feature of the invention is the provision of the apertured wings with horizontal ledges coincident with the slots. By the arrangement of the ledges so that they may be observed through the sight apertures from a point in front of the gauge member a pronounced manifestation of reflected light takes place at the time the level of liquid in the measure recedes from the sight openings and adjacent upper surfaces of the ledges, which enables the operator to readily determine when the various unit quantities of liquid has been withdrawn from the measure. The angle of reflection of the light on the surface of the liquid is materially altered when the liquid breaks from the sight openings onto the upper surface of the ledges, which alteration augments the visibility of the passage of the liquid level from one stage to another.

Each gauge member has a series of characters 16 on its face, one for each pair of wings, to signify the quantity of liquid in the measure when the level of liquid registers with the openings in the corresponding wings.

In utilizing the invention, the gauge tube is raised to its uppermost position, so that its upper or receiving end is higher than the overflow pipe, and is there retained in position until the measure is filled through the supply pipe 5 to its overflow level. The gauge tube 6 is then lowered so that its upper or receiving end is submerged to such point in the vessel as will permit the desired quantity of liquid in the measure to pass therefrom by gravital flow through the gauge tube. In lowering the gauge tube, it is adjustably positioned in the customary manner so that the withdrawal of liquid from the measure will cease when the level of liquid reaches the corresponding pair of wings on the gauge member and breaks from the sight openings therein, causing a manifestation of reflected light to indicate to the operator and patron that the predetermined quantity of liquid desired has been dispensed from the measure.

What I claim is:—

1. A liquid quantity indicating means, for dispensing apparatus having a transparent measure to which liquid is supplied and from which the liquid is subsequently dispensed, comprising a channel shaped member having a series of fixed lateral wings disposed in opposite pairs, there being a space between each pair, said member being disposed in said measure so as to be viewed from the exterior thereof, each of said wings having a horizontal rearwardly extending ledge and sight aperture at the juncture of the wing and ledge whereby manifestation of light reflected from said ledge is caused to appear through the sight aperture when the level of liquid recedes in the measure and breaks from said aperture over the adjacent ledge.

2. A liquid quantity indicating means, for dispensing apparatus having a transparent measure to which liquid is supplied and from which the liquid is subsequently dispensed, comprising a member including a vertical series of horizontal rearwardly extending ledges thereon, spaced apart, and having a corresponding series of sight apertures coincident therewith, whereby manifestations of reflected light are caused to appear through the respective sight apertures when the level of liquid recedes in the measure and breaks from the apertures over the corresponding ledges.

In testimony whereof I affix my signature.

FRANK B. EILERS.